Aug. 16, 1966   R. A. PETERSON ETAL   3,266,816
DRAFT ASSEMBLY FOR TANDEM TRACTORS
Filed Oct. 6, 1964                                2 Sheets-Sheet 1
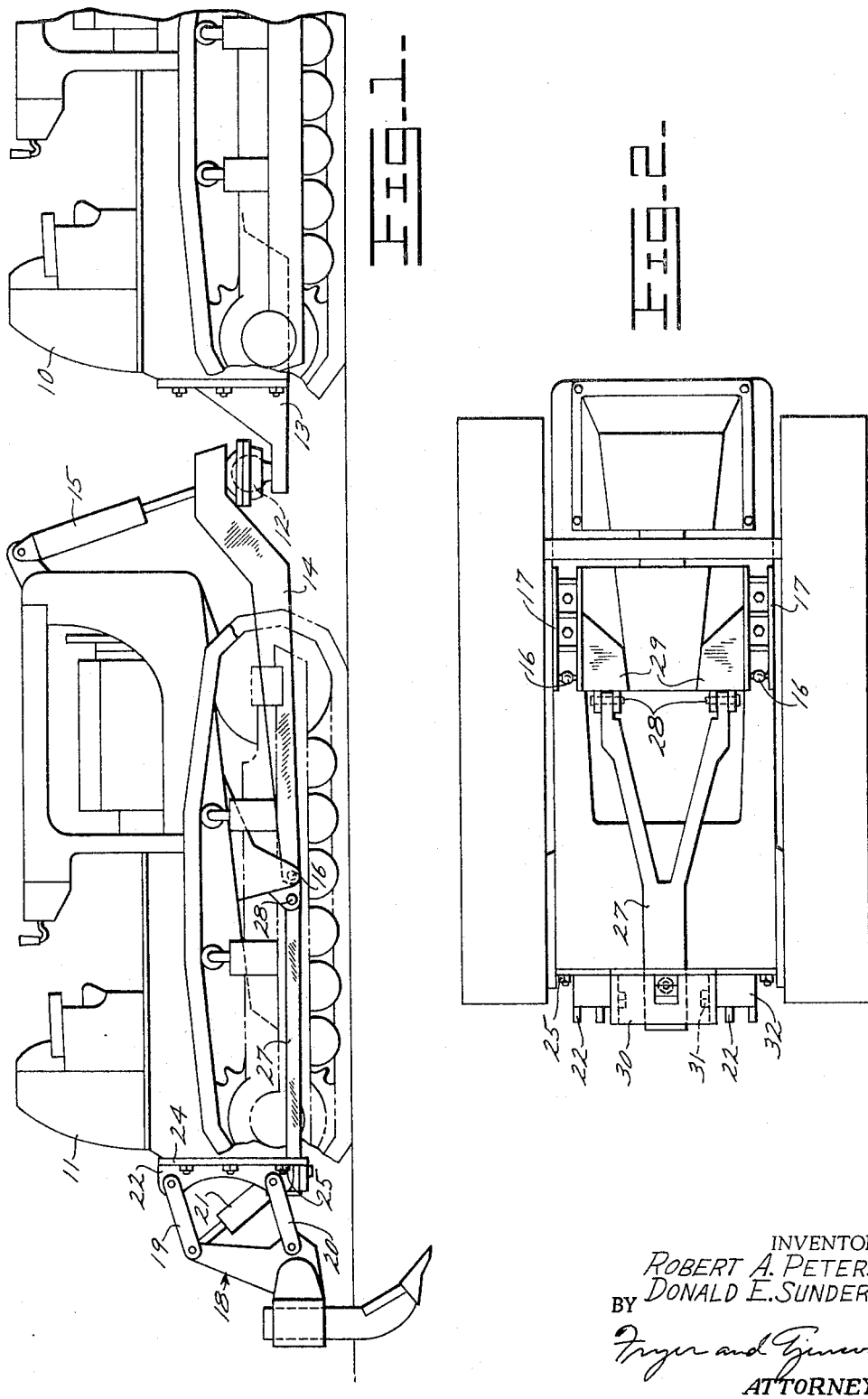
INVENTORS
ROBERT A. PETERSON
DONALD E. SUNDERLIN
BY
Fryer and Griswold
ATTORNEYS

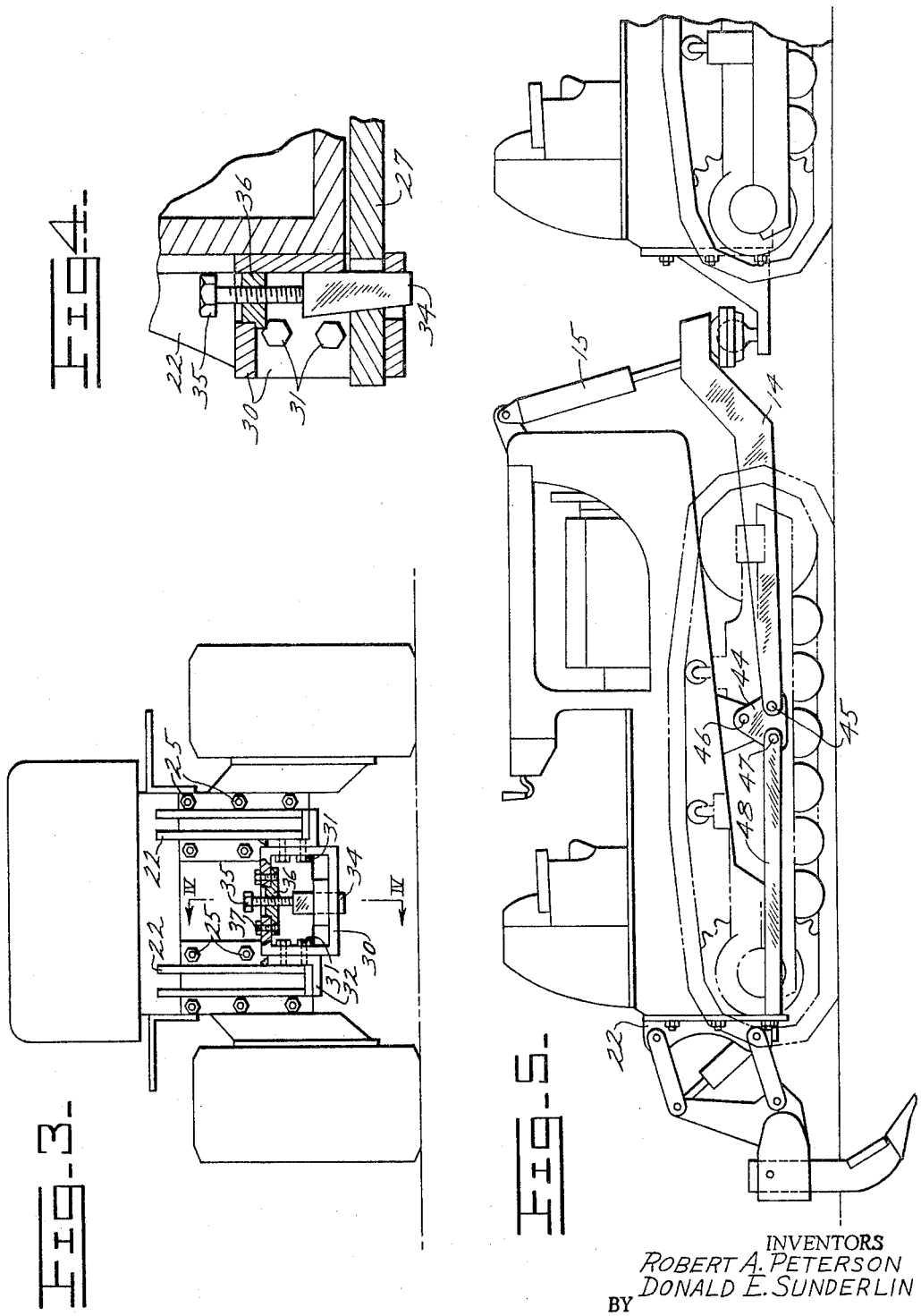

United States Patent Office 3,266,816
Patented August 16, 1966

3,266,816
DRAFT ASSEMBLY FOR TANDEM TRACTORS
Robert A. Peterson, San Leandro, Calif., and Donald E. Sunderlin, Washington, Ill., assignors to Caterpillar Tractor Co., Peoria, Ill., a corporation of California
Filed Oct. 6, 1964, Ser. No. 401,910
5 Claims. (Cl. 280—410)

This invention relates to tractors which are coupled together for tandem operation and particularly to means for distributing stresses imposed by an implement drawn by the rear tractor to the front tractor so that such stresses are divided rather than concentrated in one machine.

Large tractors coupled for tandem operation as bulldozers and pushers of earthmoving scrapers are now used, one such combination being disclosed for example in my copending application for United States Letters Patent entitled "Tandem Tractor Hitch," filed March 31, 1964, Serial No. 356,131, now abandoned.

In most push loading operations where a tractor is engaged in pushing earthmoving scrapers during the most difficult part of their load cycle there is more or less free time for the pusher tractor as the scrapers travel between the borrow pit and fill area. This time is customarily used in bulldozing and ripping operations for maintaining satisfactory contours and loosening soil at the pit.

The logical location for a heavy duty ripper on a tandem tractor combination is at the rear of the rearmost tractor and since a ripper or any implement so mounted is subject to the pulling force of both tractors the stresses imposed in the area where the implement is connected to one tractor are likely to create mechanical failure. For example two large tractors of well known manufacture are capable when coupled in tandem of exerting forces at the point of connection with a drawn implement in the magnitude of 175,000 to 200,000 pounds. Since a ripper is connected with the rear tractor by studs threaded into the rear end of the tractor final drive housing distortions and failure may be expected to occur if the full drawbar capacity of both tractors is applied.

It is the object of the present invention to provide a draft assembly for use with tractors coupled in tandem to distribute the stresses resulting from pulling a drawn implement to the bodies of both tractors.

Further objects and advantages of the invention and the manner in which it is carried into practice are made apparent in the following specification wherein reference is made to the accompanying drawings.

In the drawings:

FIG. 1 is a schematic view in side elevation of two track type tractors coupled in tandem, the forward portion of the front tractor not being shown and the rear tractor being illustrated as supporting a ripper implement;

FIG. 2 is a bottom plan view of the rear tractor shown in FIG. 1 with the ripper implement removed and with a forwardly extending C-frame which forms a part of the coupling with the front tractor also removed;

FIG. 3 is a rear view of the rear tractor of FIG. 1 with the ripper removed but illustrating the brackets which support the ripper and a load transmitting mechanism of the present invention;

FIG. 4 is an enlarged fragmentary section taken on line IV—IV of FIG. 3 and disclosing a part of the load transmitting mechanism of the present invention; and FIG. 5 is a view like FIG. 1 illustrating a modified form of the invention.

FIG. 1 of the drawings shows a forward tractor 10 and a rear tractor 11 coupled for tandem operation by a ball and socket joint 12. The ball is carried by a bracket 13 secured to the rear of the forward tractor and the socket portion is carried by a C-frame 14, two arms of which extend forwardly on the inner side of the tractor track and connect with pivot points in the form of balls shown at 16 in FIG. 2 which are carried by brackets 17 rigidly secured to the tractor frame, such pivot points being commonly used for supporting bulldozer C-frame on tractors of this type. A hydraulic cylinder 15 is associated with the coupling or hitch for weight transfer and stabilizing functions as described in the above mentioned application.

The rear tractor is shown as carrying a ripper implement, generally indicated at 18, which is adapted to be raised and lowered through supporting parallel linkages shown at 19 and 20 by means of a hydraulic jack 21, all in a conventional manner. The forward ends of the links 19 and 20, there being two of each, are pivoted between two pairs of brackets 22 best shown in FIGS. 2 and 3 where the ripper implement has been removed. Each pair of brackets 22 is carried on a plate 24 and these plates are secured to the rear of the final drive housing of the tractor as by studs and nuts illustrated at 25.

With a combination of the kind above described, the ripper implement may be pulled through very hard earth or may encounter large rocks or other hidden articles which will impose extremely high loads and which loads in a conventional construction of the type so far described are all imposed through the studs 25 to the final drive housing and main frame of the single rear tractor.

In order to prevent this concentration of stresses in one tractor, the present invention provides means for transmitting a proportionate share of the loads to the main frame of the forward tractor. This means comprises a Y-shaped yoke or stress transmitting bar best shown at 27 in FIG. 2. At its forward end the bar is bifurcated and has pivotal connections as shown at 28 with brackets 29 securely fixed as by welding to the brackets 17 which carry the pivot balls 16 of the C-frame 14. This stress transmitting yoke 27 is secured at its rear end with respect to the ripper brackets 22 and maintained under tension to insure that tensile stresses imposed by the ripper will be transmitted forwardly through the hitch which comprises the C-frame 14, the ball and socket joint 12 and the bracket 13 and to the main frame of the forward tractor.

The connection of the yoke 27 with the ripper supporting brackets 22 is best illustrated in FIGS. 2 and 3. It comprises a rectangular frame 30 connected as by cap screws 31 with reinforcing angles 32 welded to the brackets 22. The rear end of the yoke 27 extends through the frame 30 and has a perforation through which a wedge 34 extends (see also FIG. 4). This wedge may be urged downwardly by a screw 35. The screw is threaded through a flanged nut 36 held in place in the member by cap screws shown at 37. The flanged nut 36 is partially disposed in an opening extending through the upper part of the member 30 and this opening is sufficiently large to permit removal of the wedge 34 when the screws 37 and flanged nut 36 are removed. The screw 35 is tightened sufficiently to insure that the yoke 27 is under stress so that any further stress imposed by movement of the ripper through the earth will be transmitted to the yoke and through the C-frame 14 and bracket 13 to the frame of the forward tractor.

A modified form of stress transmitting linkage is illustrated in FIG. 5 wherein the C-frame 14 of the rearward tractor is shown as pivoted to a plate 44 as at 45. The same plate is pivotally supported with respect to the tractor frame at 46 and also carries a pivot 47 for the forward end of a link 48 which extends rearwardly and is rigidly connected to one pair of ripper supporting brackets 22. With one such connection at each side of the tractor, stresses imposed on the ripper will be effectively transferred forwardly to the forward tractor.

We claim:

1. In combination with tractors coupled for operation in tandem and having a hitch consisting of a bracket fixed to the rear of one tractor, a C-frame pivoted to the other tractor and extending forwardly thereof, and an articulate connection between the bracket and frame; an implement secured to the rear of said other tractor, and a stress transmitting structure extending between the implement and the C-frame pivots.

2. The combination of claim 1 in which the stress transmitting structure comprises a Y-shaped beam with its bifurcated end facing the C-frame pivots and its opposite end connected with the implement.

3. The combination of claim 2 in which the said opposite end has an opening, and wedge means in said opening engaging means on the tractor adjacent the implement to produce tension in the beam.

4. The combination of claim 1 in which the stress transmitting structure comprises a bifurcated beam connected to the implement and having two forwardly extending parts, and a connection between the forward end of each part and one of the C-frame pivots.

5. The combination of claim 4 in which said connections each comprise a member pivoted to the tractor, and having pivotal connections with both the C-frame and one of said parts.

References Cited by the Examiner

UNITED STATES PATENTS

| | | | |
|---|---|---|---|
| 1,515,756 | 11/1924 | Roy | 180—9.4 X |
| 2,727,581 | 12/1955 | Wright | 180—12 |
| 2,849,073 | 8/1958 | Gaspardo. | |
| 2,962,300 | 11/1960 | Garman | 280—402 X |
| 3,127,193 | 3/1964 | Johnson et al. | 280—9.4 X |
| 3,214,192 | 10/1965 | Hamm | 180—9.4 X |

LEO FRIAGLIA, *Primary Examiner.*